Patented May 22, 1951

2,554,202

UNITED STATES PATENT OFFICE 2,554,202

ISOMERIZATION OF OLEFINS WITH BORON ORTHO PHOSPHATE CATALYST

Donald McNeil and Peter William Reynolds, Norton-on-Tees, England, assignors to Imperial Chemical Industries Limited, a corporation of Great Britain No Drawing. Application October 18, 1948, Serial No. 55,238. In Great Britain October 21, 1947

5 Claims. (Cl. 260—683.2)

This invention relates to the isomerisation of hydrocarbons.

According to the present invention olefinic hydrocarbons are isomerised by bringing them in the gaseous state into contact at elevated temperature with a catalyst comprising boron orthophosphate.

In this specification the term "isomerisation" as applied to olefines means the conversion of straight-chain olefines into branched chain olefines, an example being the conversion of normal butene into isobutene.

The term "gaseous" as used in this specification designates normally liquid substances in the vaporised form as well as substances which are gaseous under normal conditions of temperature.

The catalyst may comprise boron orthophosphate carried on a suitable support. Suitable supports are for example alumina, pumice, firebrick or similar inert material. It is preferred however, to employ unsupported boron orthophosphate. A catalyst suitable for use in the process of the present invention may be prepared by mixing suitable quantities of boric acid with aqueous phosphoric acid containing 90% of $H_3PO_4$, and heating the mixture to drive off water whereby a crystalline powder is obtained. This powder may be rubbed through a sieve, mixed with a small quantity of powdered graphite and formed into pellets of suitable size, e. g., into cylinders $\frac{3}{16}''$ in diameter and $\frac{3}{16}''$ in height.

The process of the present invention may be carried out within a wide temperature range, e. g. from 350° to 600° C. At 350° C., however, polymer formation is considerable, while at 600° C. the extent of cracking of the olefinic hydrocarbon is pronounced. It is preferable to operate at a temperature of 500° C. because at this temperature the product contains small amounts only of compounds produced by cracking and polymerisation of the olefine.

After the process has been operated for some time the activity of the catalyst tends to decrease as a result of a carbon deposition thereon. It is therefore advantageous to regenerate the catalyst from time to time by treatment with an oxygen-containing gas which may be air or air diluted with an inert diluent such as nitrogen. Thus the process may be operated as a cyclic process in which a batch of catalyst in a suitable reaction vessel is used in the isomerisation of an olefinic hydrocarbon for a chosen period, after which the catalyst is subjected to the action of an oxygen-containing gas at elevated temperature to remove deleterious carbonaceous deposits, the isomerisation process then being resumed. It is preferred to carry out the catalyst regeneration at 700° C., and to perform the steps of isomerization and regeneration alternately in half hour cycles. It has been found that the extent of cracking and polymer formation is decreased as the age of the catalyst increases.

The pressure at which the process of the present invention is carried out is not critical, and in consequence it is convenient to carry out the isomerisation at substantially atmospheric pressure.

The addition of a small amount of water vapour is advantageous in carrying out the isomerisation. Thus in the isomerisation of butenes using the preferred catalyst the presence of water vapour gives rise to an increased concentration of isobutene in the exit gas. The water vapour can be introduced by passing the olefine through water maintained at room temperature prior to introducing the olefine into the convertor.

Instead of operating the process of the present invention as a cyclic process as hereinbefore described, it may be carried out as a continuous process by using two interconnected vessels, through which system the catalyst is continuously circulated. The isomerisation process is carried out continuously by feeding the olefine to one of the vessels maintained at a suitable temperature, while the regeneration process is carried out in the other, suitable quantities of an oxygen-containing gas being continuously fed to the second vessel. In this method of operation, catalyst is continuously fed to and removed from both the isomerisation vessel and the other vessel where the regeneration process occurs. Regenerated catalyst will flow from the second vessel and will be continuously returned to the first vessel in which the isomerisation process is taking place.

If desired the hereinbefore described continuous process may be carried out with the catalyst maintained in one or both of the vessels in the so-called fluidised state. In this specification the term "fluidised state" refers to that state assumed by particulate material when a gas and/or vapour is passed through, the particle size of the particulate material and the velocity at which the gas and/or vapour is passed therethrough being chosen so that the particulate material assumes many of the properties of a liquid, for example it can easily be stirred, poured from one vessel to another, can flow through pipes and establish fluistatic heads.

Example 1

A boron phosphate catalyst was prepared by mixing together 620 grams of powdered boric acid ($H_3BO_3$) and 1200 grams of aqueous phosphoric acid containing 90% by weight of $H_3PO_4$. The mixture was heated with constant stirring to complete the reaction:

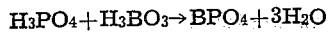

$$H_3PO_4 + H_3BO_3 \rightarrow BPO_4 + 3H_2O$$

The resulting cake was broken up, ignited in air for 5 hours at 350° C. and granulated to pass a 10 B. S. sieve. The product was pelletted to ⅛" cylinders after the addition of 3% graphite as pelleting lubricant. A butene-containing gas was passed over the catalyst maintained at a temperature of 500° C., the composition of the inlet and exit gases being given below. It will be seen that the isobutene content of the gas was considerably increased.

|  | Gas Composition ||
|---|---|---|
|  | Inlet gas | Exit gas |
| $H_2$ | nil | 1.0 |
| $C_3H_6$ | nil | 3.2 |
| $C_3H_8$ | nil | 0.2 |
| Isobutene | 6.4 | 30.7 |
| n-Butenes | 92.2 | 59.2 |
| Butanes | 1.4 | 2.8 |
| Residues | nil | 2.8 |

The polymer make was 3.1 grams per 100 grams of inlet gas.

Example 2

Isomerisations were carried out under the same conditions as those described in Example 1. The results given in the table below illustrate the effect of catalyst age upon the isomerisation. It will be observed that as the age of the catalyst is increased, cracking and polymer formation are decreased.

|  | Catalyst age—45 hrs. || Catalyst age—450 hrs. ||
|---|---|---|---|---|
|  | Inlet | Exit | Inlet | Exit |
| $H_2$ | nil | 0.5 | nil | 0.1 |
| $CH_4$ | nil | 0.3 | nil | 0.1 |
| $C_3H_6$ | nil | 2.8 | nil | nil |
| $C_3H_8$ | nil | 0.8 | nil | nil |
| Isobutene | 4.3 | 26.2 | 1.5 | 31.7 |
| Butene-1 | }70.3 | 39.7 | {19.5 | 16.5 |
| Butene-2 |  |  | 76.8 | 50.2 |
| Butanes | 25.4 | 27.3 | 1.8 | nil |
| Residue | nil | 2.4 | 0.4 | 1.4 |
| Polymer (per 100 gm. feed) |  | 0.9 |  | nil |

Example 3

Pentene-2 was passed over a catalyst prepared as described in Example 1 at 400° C. at a liquid space velocity of 0.5. The product was hydrogenated and analysed. It was shown to contain 68.5% isopentane, 22.5% normal pentane, 8.9% higher boiling products and 0.4% lower boiling products.

Example 4

Octene-1 was passed over a catalyst prepared as described in Example 1 at 400° C. at a liquid space velocity of 0.5. The product was hydrogenated and analysed. It was shown to contain 40% of branched chain isomers which appeared to include a substantial amount of 3-methyl heptane.

We claim:
1. A process for the production of branched chain alkenes containing from 4 to 8 carbon atoms in the molecule which comprises bringing a normal alkene containing from 4 to 8 carbon atoms in the molecule in the gaseous state into contact at a temperature within the range 350° to 600° C. with a catalyst comprising boron ortho-phosphate.
2. A process as set forth in claim 1 wherein the preferred temperature is 500° C.
3. A process as set forth in claim 1 wherein the normal alkene is at atmospheric pressure.
4. A process for the production of isobutene which comprises bringing normal butene in the gaseous state into contact at a temperature within the range 350° to 600° C. with a catalyst comprising boron ortho-phosphate.
5. A process for the production of isopentene which comprises bringing pentene-2 in the gaseous state into contact at a temperature within the range 350° to 500° C. with a catalyst comprising boron ortho-phosphate.

DONALD McNEIL.
PETER WILLIAM REYNOLDS.

REFERENCES CITED

The following references are of record in the file of this patent:

UNITED STATES PATENTS

| Number | Name | Date |
|---|---|---|
| 1,985,792 | Meerwein | Dec. 25, 1934 |
| 2,336,600 | Fawcett | Dec. 14, 1943 |
| 2,403,524 | Hagemann | July 9, 1946 |
| 2,422,884 | Burgin | June 24, 1947 |